United States Patent
Goncalves et al.

(10) Patent No.: US 8,621,617 B2
(45) Date of Patent: Dec. 31, 2013

(54) METHOD OF SECURING EXECUTION OF A PROGRAM

(75) Inventors: Louis-Philippe Goncalves, Deuil la Barre (FR); Guillaume Roudiere, Boulogne Billancourt (FR); David Decroix, Montreuil (FR)

(73) Assignee: MORPHO, Paris (FR)

( * ) Notice: Subject to any disclaimer, the term of this patent is extended or adjusted under 35 U.S.C. 154(b) by 269 days.

(21) Appl. No.: 12/922,553

(22) PCT Filed: Mar. 12, 2009

(86) PCT No.: PCT/FR2009/000254
§ 371 (c)(1),
(2), (4) Date: Oct. 28, 2010

(87) PCT Pub. No.: WO2009/115712
PCT Pub. Date: Sep. 24, 2009

(65) Prior Publication Data
US 2011/0067104 A1    Mar. 17, 2011

(30) Foreign Application Priority Data
Mar. 14, 2008 (FR) ..................................... 08 01406

(51) Int. Cl.
*G06F 21/00* (2013.01)
(52) U.S. Cl.
USPC ............................................. 726/22; 713/166
(58) Field of Classification Search
USPC ............................................. 713/164; 726/22
See application file for complete search history.

(56) References Cited

U.S. PATENT DOCUMENTS

| 4,251,885 | A | * | 2/1981 | Dodt et al. | 714/50 |
|---|---|---|---|---|---|
| 5,819,094 | A | * | 10/1998 | Sato et al. | 717/131 |
| 5,974,549 | A | * | 10/1999 | Golan | 726/23 |
| 7,243,098 | B2 | * | 7/2007 | Wang et al. | 1/1 |
| 7,496,551 | B1 | * | 2/2009 | Jalagam et al. | 706/47 |
| 7,840,800 | B2 | * | 11/2010 | Boudou et al. | 713/164 |
| 2004/0168078 | A1 | | 8/2004 | Brodley et al. | |
| 2006/0005019 | A1 | * | 1/2006 | Chao | 713/166 |
| 2006/0224866 | A1 | * | 10/2006 | Grisenthwaite et al. | 712/226 |
| 2009/0089764 | A1 | * | 4/2009 | Lai et al. | 717/143 |

FOREIGN PATENT DOCUMENTS

| DE | 10252347 A1 | 5/2004 |
|---|---|---|
| EP | 1450232 A1 | 8/2004 |
| FR | 2859548 | 3/2005 |

OTHER PUBLICATIONS

Microsoft Computer Dictionary, Fifth Edition, 2002, p. 495.*

* cited by examiner

*Primary Examiner* — Mohammad L Rahman
(74) *Attorney, Agent, or Firm* — Muncy, Geissler, Olds & Lowe, PLLC

(57) ABSTRACT

A method of securing execution of a main program that implements nested functions, the method comprising the steps of executing a security management program arranged to update a list of current functions, informing the security management program of the beginning of execution of each function of the main program and updating the list of current functions, informing the security management program of the end of execution of each function, and, after being informed of each end of execution of a function, verifying that the function is indeed the function that was begun the most recently.

6 Claims, 1 Drawing Sheet

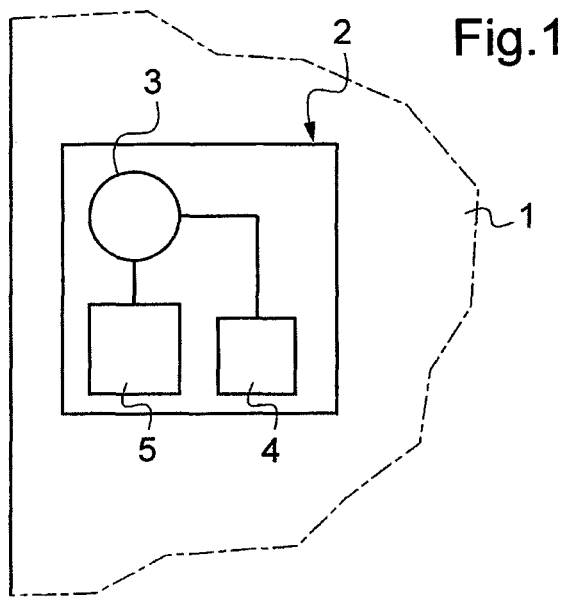
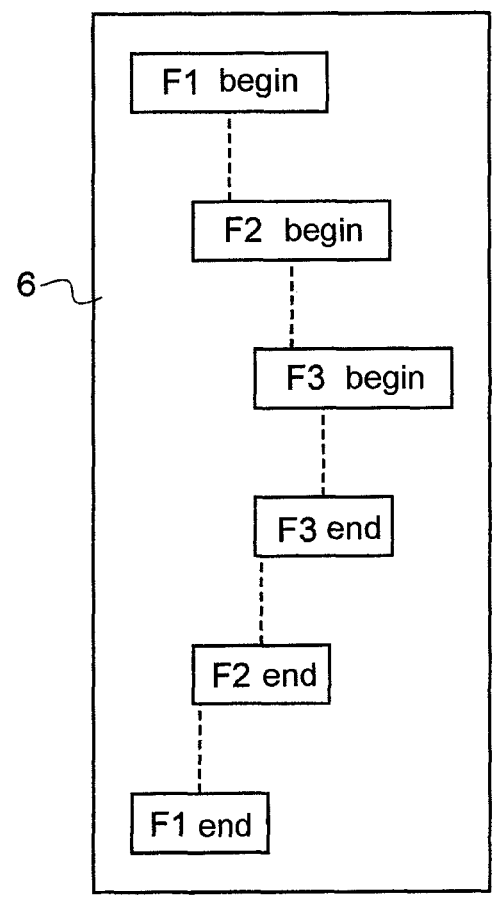
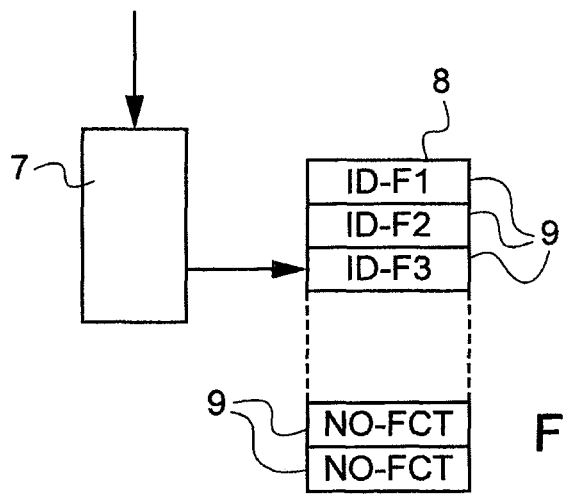

METHOD OF SECURING EXECUTION OF A PROGRAM

The present invention relates to a method of securing the execution of a program by a microprocessor, and in particular a microprocessor of a data medium card such as a bank card or an electronic identity card.

BACKGROUND OF THE INVENTION

Such a card has an integrated circuit that generally comprises a microprocessor, a volatile memory, and a non-volatile memory. The non-volatile memory contains personal data such as the identity of the person to whom the card has been issued, a secret identification code, banking information, etc. ..., and at least one main program enabling information to be exchanged between the card and a reader of a terminal to which the card is connected, such as an automatic teller machine (ATM) or a payment terminal. The main program implements a plurality of nested functions serving in particular to communicate various items of personal data to the terminal, to retrieve a code input by the user to the terminal, to perform calculations on the code, e.g. for cryptographic or authentication purposes, to communicate the result of authentication to the terminal, .... These functions are nested in the sense that while a first function is being executed, it calls a second function which in turn, while it is being executed, calls a third function, etc....; the return of execution to the second function and then to the first function takes place in succession after the ends of execution of the third function and of the second function respectively. In order to allow return to the calling function, the microprocessor manages a function call stack that enables it to store a return address each time a function is called so that, at the end of execution of the called function, the microprocessor recovers the address stored in the function call stack and positions its execution pointer at that address so as to continue with execution of the calling function.

In such cards, one of the functions that is critical in terms of security consists in decrementing a counter on each failure of an authentication operation that consists in verifying that a code input to the terminal is indeed identical to the secret identification code stored in the integrated circuit of the card. With a bank card, this number of failures is generally set at three, while the code itself comprises four digits. The counter as decremented in this way is returned to its initial value after a successful verification of the code. In contrast, after three failures of code verification, the integrated circuit is blocked. There exists a fraudulent technique that consists in disturbing the operation of the card at the end of the authentication operation in order to prevent execution of the function that serves to decrement the counter. It can be understood that if that function is not performed, then a dishonest person can try out all possible combinations of four digits in order to find the correct combination.

Another fraudulent technique consists in disturbing the operation of the microprocessor so as to give rise to unexpected behaviors of the microprocessor, possibly making it possible to recover data that ought normally to be kept secret. For example, it is possible to envisage that after a function has been called by a calling function, execution may be returned to the calling function before the called function has come to the end of its execution.

OBJECT OF THE INVENTION

The invention provides means for securing the execution of a program that involves nested function calls.

SUMMARY OF THE INVENTION

To this end, the invention provides a method of securing execution of a main program that implements nested functions, the method comprising the steps of:
  executing a security management program arranged to update a list of current functions;
  informing the security management program of the beginning of execution of each function of the main program and updating the list of current functions;
  informing the security management program of the end of execution of each function;
  after being informed of each end of execution of a function, verifying that the function is indeed the function that was begun the most recently; and
  in the event of the verification failing, performing a protection action that is selected as a function of a security level associated with each function.

Thus, the list held by the security management program serves to detect abnormal operation of the main program, and more particularly of its function calling.

Preferably, and by way of example, the protection action consists in issuing a warning or in interrupting the main program.

In a particular implementation, the list of functions is a table comprising a sequence of fields for receiving respective function identifiers, the method comprising the steps of:
  initializing the fields; and
  on being informed of the beginning of the execution of a function, writing the identifier of the function in the first available field.

This implementation is particularly simple and effective and requires only limited use of computation and memory resources.

Advantageously, the method includes the step, on being informed of the end of execution of a function called by a calling function, of storing the called function in memory and of causing the function calling the security manager to verify that the most-recently executed function is the called function.

Other characteristics and advantages of the invention appear on reading the following description of a particular, non-limiting implementation of the invention.

BRIEF DESCRIPTION OF THE DRAWING

Reference is made to the accompanying drawing, in which:
  FIG. 1 is a diagrammatic view of a data card usable for implementing the method of the invention;
  FIG. 2 is a diagrammatic representation of the running of a main program in the context of the method in accordance with the invention; and
  FIG. 3 is a diagram representing the running of a security management program in the context of the method in accordance with the invention.

DETAILED DESCRIPTION OF THE INVENTION

With reference to the figures, the invention is described below in application to a data card 1 including an integrated circuit, given overall reference 2, comprising a microprocessor 3 connected to volatile memory 4, e.g. of the random access memory (RAM) type, and to non-volatile memory 5, e.g. of the read-only memory (ROM) type or of the electrically-erasable programmable ROM (EEPROM) type.

The non-volatile memory 5 contains a main program, represented by 6 in FIG. 2, that implements nested functions F1, F2, and F3. The function F1 is arranged so that on being executed it calls a function F2 that itself is arranged so that on being executed it calls a function F3. At the end of execution of the function F3, the function F2 continues, and at the end of execution of the function F2, the function F1 continues. The natures of the functions F1, F2, and F3 is of little importance, and by way of example these functions may perform operations of recovering a code value input to a terminal that is connected to the smart card, calculation operations, code verification operations, encryption operations, incrementing or decrementing a counter, writing to a memory, etc......

Each function F1, F2, and F3 possesses an identifier ID-F1, ID-F2, or ID-F3 designating said functions in unique manner. The function identifiers are constructed in such a manner as to contain in encoded form information that is specific to the function, and in particular a security level.

The non-volatile memory 5 also contains a security management program, represented by 7 in FIG. 3, which program is arranged to establish and update a list of functions being executed or a function call stack. The list is in the form of a table 8 having a sequence of fields 9, each serving to receive the identification of a function that is being executed. In a manner that is itself known (and therefore not described in detail herein), the security management program 7 makes use of an index to point to the first available field in the stack. The security management program also has access to a table associating protection actions that are to be performed as a function of the security levels encoded in the function identifiers.

The method of the invention is described below.

In operation, when the microprocessor 3 of the card 1 executes the main program 6, it simultaneously executes the security management program 7.

On starting, the fields 9 of the table 8 are initialized by writing a default value thereto, here NO-FCT, and the index points to the first field containing said default value (also referred to as an available field).

When the main program executes the function F1, the function F1 informs the security management program 7 that its execution has begun by means of a FUNCTION-BEGIN interface (where such an interface is itself known). The security management program 7 then writes the identifier ID-F1 of the function F1 in the first available field 9 of the table 8 and causes its index to point to the following field 9 that then becomes the first available field.

When the function F1 calls the function F2, the function F2 informs the security management program of the beginning of its execution by means of the FUNCTION-BEGIN interface. The security management program 7 then writes the identifier of the function F2 (i.e. ID-F2) in the field 9 that is pointed to and then causes the index to point to the following field 9.

When the function F2 calls the function F3, the function F3 informs the security management program 7 of the beginning of its execution, with the identifier ID-F3 of the function F3 then being written into the field pointed to by the index and with the index being pointed to the following field 9.

When execution of the function F3 comes to an end, the function F3 informs the security management program 7 that its execution has ended by means of a FUNCTION-END interface (when such an interface is itself known). The security management program 7 then verifies that the function F3 informing it of the end of its execution is indeed the function that began execution the most recently. If so, execution of the function F2 continues until it comes to an end with the function F2 then informing the security management program 7 of the end of its execution by means of the FUNCTION-END interface. The security management program 7 then verifies that the function F2 is indeed the function that began execution the most recently. If so, execution of the function F1 restarts until it comes to an end.

In the event of the function informing the security management program 7 of the end of its execution not being the function that began execution the most recently, the security management program 7 performs a protection action. In this example, the protection action is to issue a warning to the main program 6, which interrupts its own execution. The protection action could also give rise to the card being blocked, e.g. with it being possible for the card to be unblocked by the issuing organization after it has verified the identity of the card holder. The protection action may be a security counter measure. The term security counter measure is used to mean means serving in particular to avoid information being recovered by a dishonest person, e.g. by:

causing the clock frequency to vary; or randomly inserting instructions to modify the duration of code execution, the emission of electromagnetic waves, or the consumption of energy while code is being executed, . . . .

At the beginning of execution of the function, the security management program uses the identifier of said function to determine which protection action(s) or security countermeasure(s) should be activated. In a variant, in the event of execution of a function coming to an end when said function is not the function that began execution the most recently, the security management program may be arranged to deduce which protection action needs to be executed from the identifier of the function.

The security management program may also be arranged to activate at least one security countermeasure at the beginning of execution of a function. The identifier function is then preferably determined so as to inform the security management program of the need to activate such a measure without necessarily constituting an indication of the nature of said countermeasure (the countermeasure may be the same for all functions that require such activation).

In another variant, the method may include the step of storing the most-recently executed function in memory when said function indicates the end of its own execution. The function that called the most-recently executed function may then interrogate the security management program, requesting it to verify consistency between the nominal execution of the program and its real execution. In the above-described example, when the function F3 has indicated the end of its execution, the function F2 may request the security management program to verify that it is indeed the function F3 that has just ended.

Naturally, the invention is not limited to the implementation described and various implementations may be applied thereto without going beyond the ambit of the invention as defined by the claims.

In particular, in a variant, it is possible to provide a table of the possible function calls from each function of the main program. By way of example, if the function F2 calls the function F3, then the security management program verifies that the function F2 does indeed have authorization to call the function F3. It is also possible to associate the functions in groups and to devise function identifiers that associate the functions with the groups to which they belong so as to enable the security management program to verify that functions calling one another do indeed belong to a common group.

What is claimed is:

1. A method of securing execution of a main program that implements nested functions, the method comprising the steps of:

executing a security management program arranged to update a list of current functions;

informing the security management program of a beginning of execution of each function of the main program and updating a list of current functions identifiers;

informing the security management program of an end of execution of each function;

after being informed of each end of execution of a function, verifying that the function is indeed the function that was begun the most recently; and in the event of the verification failing, performing a protection action that is selected as a function of a security level associated with each function, wherein the list of functions identifiers is a table comprising a sequence of fields for receiving respective function identifiers, the method comprising the steps of:
   initializing the fields; and
   on being informed of the beginning of the execution of a function, writing the identifier of the function in the first available field, and wherein the identifier of each function contains a security level associated with the function and the security management program has access to a table associating protection actions that are to be performed according to security levels.

2. The method according to claim 1, wherein the protection action consists of issuing a warning.

3. The method according to claim 1, wherein the protection action consists of interrupting the main program.

4. The method according to claim 1, wherein the security management program has access to a table of possible function calls from each function of the main program.

5. The method according to claim 1, wherein, on being informed of the end of execution of a function called by a calling function, the method consists of storing the identifier of the function that is called in memory and causing the function calling the security manager to verify that the most-recently executed function is the called function.

6. The method according to claim 1, wherein, at the beginning of execution of a function, the security management program activates at least one security countermeasure.

* * * * *